No. 680,008. Patented Aug. 6, 1901.
R. STODDARD.
SILO.
(Application filed Mar. 11, 1901.)
(No Model.)
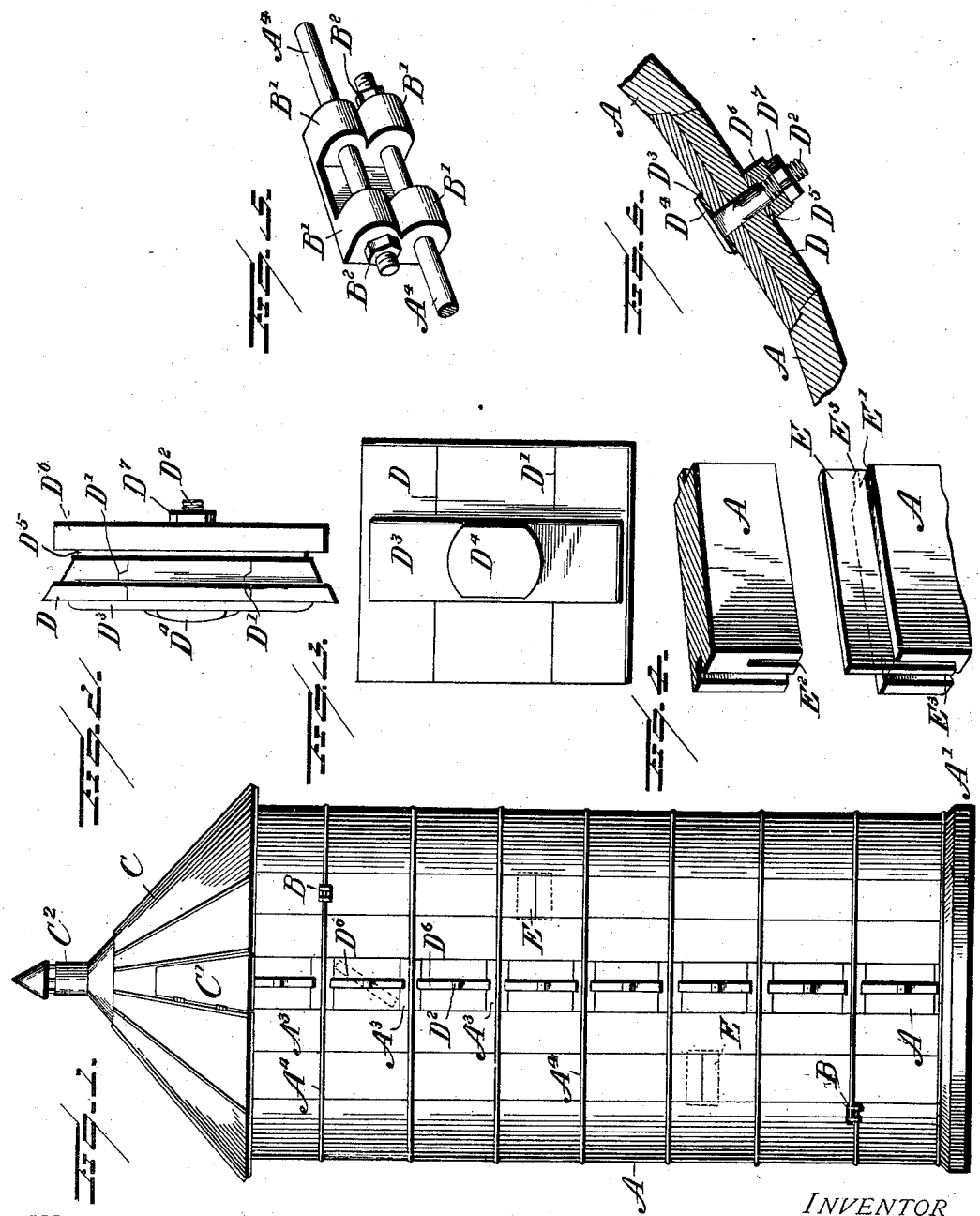
WITNESSES:
Wm. F. Doyle.
Alfred T. Gage.
INVENTOR
Ralph Stoddard,
BY E. B. Stocking
Attorney

UNITED STATES PATENT OFFICE.

RALPH STODDARD, OF RUTLAND, VERMONT, ASSIGNOR TO MOSELEY & STODDARD MANUFACTURING COMPANY, OF SAME PLACE.

SILO.

SPECIFICATION forming part of Letters Patent No. 680,008, dated August 6, 1901.

Application filed March 11, 1901. Serial No. 50,634. (No model.)

*To all whom it may concern:*

Be it known that I, RALPH STODDARD, a citizen of the United States, residing at Rutland, in the county of Rutland, State of Vermont, have invented certain new and useful Improvements in Silos, of which the following is a specification, reference being had therein to the accompanying drawings.

This invention relates to silos, and particularly to that structure embodying a vertical opening extending the entire height of the same and closed by removable doors or sections.

The invention has for an object to perfect the structure of these doors, so that when the same are placed in position they will render the silo practically air-tight, thus preserving the fodder or hay in very much better condition than when air is admitted into the silo or tank.

The proper preservation of fodder for dairy cows has become a very important art, as the nearer the nature of the winter's feed approaches that given in the summer the more equal will be the quantity and quality of winter milk in amount, color, and richness. In the ordinary structure of silo no material attempt has been made to render the closures air-tight, thus preserving the packed hay or fodder in the closed portion of the silo from any influence of the atmosphere and preventing drying out of the same to destroy the green character of the fodder, which is essential for winter feeding.

A further object of the invention is to improve the several details of construction relative to the front or open portion of the silo, so as to materially assist in securing the air-tight closure of the door-sections when placed in position.

Other objects and advantages of the invention will hereinafter appear in the following description, and the novel features thereof will be particularly pointed out in the appended claims.

In the drawings, Figure 1 represents a side elevation of a silo with this invention applied thereto. Fig. 2 is an edge view of one of the door or closure sections. Fig. 3 is a rear view of the same. Fig. 4 is a detail perspective of a means for joining the meeting ends of the vertical staves forming the body of the structure. Fig. 5 is a perspective of the improved hoop-buckle used herein, and Fig. 6 is a detail horizontal section through a closed door and a portion of the silo.

Like letters of reference indicate like parts throughout the several figures of the drawings.

The letter A designates the body of the silo, which is erected upon a suitable foundation A' of any desired character, preferably a concrete surface upon a stone foundation, while the body A is constructed of tongue-and-groove boards or staves in order to effect an air-tight joint between the same, which end is further attained by any suitable coating within or without the structure. At the front of the silo a longitudinal opening $A^2$ extends the entire height thereof, and the staves upon the opposite sides of this opening are held in position relative to each other by means of a series of cross-bars $A^3$, suitably secured in position. A series of hoops $A^4$ completely encircle the silo and pass over the cross-bar $A^3$, thus binding all of the parts tightly against inward compression and expansion and permitting any looseness to be taken up by the proper adjustment of the hoop. This adjustment is secured by means of a novel buckle B, having at its opposite ends integral lugs B', parallel in position and adapted to receive the opposite ends of the hoop $A^4$. These ends are suitably threaded and placed under tension by means of nuts $B^2$ or other similar devices for the purpose placed upon the threaded ends of the hoop. This form of buckle is simple in structure, so that the same can be readily formed, and is applicable for use in any position, as the lugs B' are similar in construction and function. Above the body of the silo a suitable conical cap or cover C is provided and has formed therein a door C' for access to the upper portion of the silo when the same is filled and a ventilating-top $C^2$ at its upper portion.

The doors or closures D are all formed similar in size and shape and adapted to tightly fit between the cross-bars A³, which are spaced an equal distance apart throughout the height of the silo. This door is composed of a number of sections sufficient to produce the desired size, each of which is provided with a beveled or rabbeted joint D', adapted to fit the corresponding section, and all of the sections are clamped and held together by means of a bolt D². At one side of the sections D a plate or bar D³ is provided and extends substantially the length of the door, upon which the head D⁴ of the bolt D² rests, and a similar parallel plate D⁵ is applied at the opposite side of the door-sections, thus providing a pressure means for holding the sections D together. Upon the free end of the bolt a turn-bar D⁶ is pivoted and held in position by means of a nut D⁷, which also permits an adjustment or tension to be placed upon the bar for drawing the door tightly into contact with the beveled walls of the staves at opposite sides of the opening therefor. This bar D⁶ engages the cross-bars A³ above and below the opening, and thereby holds the door or section in position. If it be desired to remove the door, this bar may be turned, as shown by dotted lines in Fig. 1, to disengage the same from the sections A³ and permit the removal of the door D by pressing the same inward.

When it is desired or necessary to join or connect the vertical meeting edges of two staves A in order to secure the necessary height for the structure, I have provided an improved connection to prevent any bulging or entrance of air through the same owing to a warping action through pressure or the presence of moisture. This connector comprises a metallic spline E, set in a groove or way E', formed in one of the stays and at one side of the tongue and groove thereof, and adapted to fit into a seat in a corresponding groove E², formed in the adjacent end of an abutting stave. It will be seen that a thoroughly tight and secure joint is produced. It will also be observed that the edges E³ of this spline extend slightly beyond the opposite ends of the stave in which it is located, so as to seat in a groove formed in the adjoining stave, and thus produce a side as well as an end lock for the free end of the stave.

In the operation of this invention when the silo is to be filled with hay or fodder all of the doors or closures are put in place and material packed within the tank from the top. As the sections reach the various heights the doors are applied, and by tightening the nuts D⁷ a thoroughly air-tight joint or connection is effected, so that the removable sections become substantially an integral part of the body of the silo. This building up is continued until the upper section is reached, to which access is obtained through the door C' of the roof or cover. As the fodder is used from the silo these sections are removed and a reverse operation to that just described is effected.

It will be observed that the doors are all of one size, and consequently interchangeable. The doors are also provided on their edges with two beveled faces and a rabbet or seat, making three separate bearings, which when drawn into position by the turn-bar being brought into engagement with the cross-bar A³ makes a perfectly air-tight joint, as a bearing is effected on one if not all of the three joints. The turn-bar is pivoted upon the bolt and secured by means of the nut, which permits of an adjustment of the tension upon the bar to suit the convenience or requirements of the device. The door herewith presented forms a material improvement in this art, as it can be conveniently taken out for the feeding of the ensilage and replaced, making an air-tight joint, the same as though the silo had never been opened.

Heretofore the wall of the silo between the door-openings has been made of a series of short staves, thus giving a less solid support for the door when firmly pressed into its seat to secure an air-tight closure, and without extra hoops passing over said short staves (which adds materially to the first cost of the silo) they are liable to be pressed inwardly, and thus to open the joints thereof to admit moisture, which in time rots the staves and produces leakage and the admission of air, all of which is objectionable. By my construction the continuous rabbets reduce cost of manufacture and are adapted to receive the ends of the spaced transverse cross-bars, which while they become a fixed part of the wall are restricted in width to make the vertical opening practically continuous, giving practically unobstructed access to the interior, and being bound firmly as a part of the circular wall by the hoops no inward depression of the wall can occur by any pressure needed to tightly close any one or all of the series of doors.

It will be obvious that changes may be made in the details of construction and configuration without departing from the spirit of the invention as defined by the appended claims.

Having described my invention, what I claim is—

1. A silo, the body of which comprises a series of staves, a series of cross-bars having door-bearings and spaced to form door-openings, each bar being in line with and abutting at its ends against the first and last stave of the series, and a hoop embracing the series of staves and a bar thereby to firmly bind the parts against separation; substantially as specified.

2. In a silo, the combination of a series of staves, a series of cross-bars spaced to form door-openings, each bar abutting at its ends against the first and last stave of the series, binding-hoops passing over the cross-bars, and a door having beveled edges and upon its outer face a pivoted locking-bar adapted to bear upon the said cross-bars; substantially as specified.

3. In a silo comprising vertical staves having tongue-and-groove connections at their sides, a metallic connector adapted to be seated in transverse grooves within the adjacent ends of abutting staves, said connector having projections beyond the side edges of said staves and being located in a vertical plane at one side of said tongue and groove; substantially as specified.

In testimony whereof I affix my signature in presence of two witnesses.

RALPH STODDARD.

Witnesses:
FRED C. SPENCER,
GEO. K. MONTGOMERY.